US008687507B2

(12) United States Patent
Johnsson et al.

(10) Patent No.: US 8,687,507 B2
(45) Date of Patent: Apr. 1, 2014

(54) METHOD, ARRANGEMENT AND SYSTEM FOR MONITORING A DATA PATH IN A COMMUNICATION NETWORK

(75) Inventors: Andreas Johnsson, Uppsala (SE);
Svante Ekelin, Vallentuna (SE);
Christofer Flinta, Stockholm (SE);
Jan-Erik Mångs, Solna (SE); Bob Melander, Sigtuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 328 days.

(21) Appl. No.: 13/120,092

(22) PCT Filed: Sep. 22, 2008

(86) PCT No.: PCT/SE2008/051057
§ 371 (c)(1),
(2), (4) Date: Mar. 21, 2011

(87) PCT Pub. No.: WO2010/033059
PCT Pub. Date: Mar. 25, 2010

(65) Prior Publication Data
US 2011/0176429 A1 Jul. 21, 2011

(51) Int. Cl.
*H04L 12/26* (2006.01)
(52) U.S. Cl.
USPC ............ 370/248; 370/247; 370/251; 370/252
(58) Field of Classification Search
USPC ................ 370/241, 247, 248, 250, 252, 251; 709/228
See application file for complete search history.

(56) References Cited

U.S. PATENT DOCUMENTS

| 2002/0169880 A1* | 11/2002 | Loguinov et al. ............ 709/228 |
| 2006/0114834 A1* | 6/2006 | Cheung et al. ............... 370/252 |
| 2006/0215572 A1* | 9/2006 | Padhye et al. ................ 370/252 |
| 2007/0025263 A1 | 2/2007 | Dunlap et al. |
| 2009/0003225 A1* | 1/2009 | Klassen et al. ............... 370/250 |
| 2009/0135728 A1* | 5/2009 | Shen et al. ................... 370/250 |

FOREIGN PATENT DOCUMENTS

| EP | 1662705 A1 | 5/2006 |
| WO | WO 2005/076530 A1 | 8/2005 |

OTHER PUBLICATIONS

International Search Report, PCT Application No. PCT/SE2008/051057, May 5, 2009.
International Preliminary Report on Patentability, PCT Application No. PCT/SE2008/051057, Jan. 4, 2011 (13 pages).
Written Opinion of the International Searching Authority, PCT Application No. PCT/SE2008/051057, May 5, 2009 (10 pages).

(Continued)

*Primary Examiner* — Brian D Nguyen
*Assistant Examiner* — Toan Nguyen
(74) *Attorney, Agent, or Firm* — Myers Bigel Sibley & Sajovec

(57) ABSTRACT

A probing method, arrangement, and system for estimating a condition, such as available bandwidth, of a data path in a communication network including multiple nodes are described. A probe-packet sender node transmits probe packets with a sent inter-packet separation and a time-to-live towards an intermediate node. Control message packets are generated by the intermediate node when the time-to-live expires. The probe-packet sender node receives the control message packets and calculates a received inter-packet separation. An estimate of the data path condition can be generated based on the sent inter-packet separation and the received inter-packet separation.

14 Claims, 2 Drawing Sheets

(56) References Cited

OTHER PUBLICATIONS

Carter et al., "Measuring Bottleneck Link Speed in Packet-Switched Networks," Technical Report BU-CS-96-006, 2006, pp. 297-318, Retrieved from the Internet: http://www.cs.bu.edu/techreports/pdf/1996-006-measuring-bottleneck-link.pdf, p. 4, line 8-p. 6, line 3, p. 7, line 11-14.

Govindan et al., "Estimating Router ICMP Generation Delays," Proceedings of Passive & Active Measurement: PAM-2002, 2002, Retrieved from Internet: http://www.pamconf.org/2002/Estimating_Router_ICMP_Generation_Delays.pdf, p. 1, col. 2, line 8-19, abstract.

Viger, "Active Probing with ICMP Packets," Internship in the Department of Electrical and Electronic Engineering, University of Melbourne, Jul. 14, 2003, Retrieved from the Internet: http://fabien.viger.free.fr/liafa/docs/report-cubin.pdf, part 1.1.2, 1.2, 1.3.2, 1.4.2, 4.1.2, figures 1.8, 4.5.

European Search Report Corresponding to European Application No. 08813554.6; Dated: Dec. 2, 2013; 6 pages.

\* cited by examiner

METHOD, ARRANGEMENT AND SYSTEM FOR MONITORING A DATA PATH IN A COMMUNICATION NETWORK

CROSS REFERENCE TO RELATED APPLICATION

This application is a 35 U.S.C. §371 national stage application of PCT International Application No. PCT/SE2008/051057, filed on 22 Sep. 2008, the disclosure of which is incorporated by reference herein in its entirety. The above-referenced PCT International Application was published in the English language as International Publication No. WO 2010/033059 A1 on 25 Mar. 2010.

TECHNICAL FIELD

The invention relates generally to monitoring data paths in communication networks, in particular in packet switched data networks.

BACKGROUND

A packet switched data network such as the Internet can be considered to comprise a mass of nodes interconnected by data paths.

In packet switched data networks such as the Internet, monitoring a data path, or in other words, estimating a condition such as available bandwidth end-to-end over a data path of the network is useful in several contexts; including Service Level Agreement (SLA) verification, network monitoring and server selection.

Mainly, there are two ways to estimate a condition such as available bandwidth, namely passive or active monitoring.

Passive monitoring of available bandwidth of an end-to-end data path requires that all of the network nodes in the network path can be accessed. However, this is typically not possible. Therefore, measuring available end-to-end bandwidth is typically done by active probing of the data path. The available bandwidth can be estimated by transmitting probe traffic, such as User Data Protocol (UDP) probe packets including a train of probe packets into the data path, and then analyzing the observed effects of cross traffic on the probe packets. Typically, large UDP probe packets having a specified inter-packet separation are transmitted. This kind of active measurement requires access to both sender and receiver hosts, in the following referred to as sender and receiver nodes, but does not require access to any intermediate node(s) in the path between the sender and receiver nodes. Conventional approaches to active probing require the transmission of probe packet traffic into the data path of interest at a rate (herein, rate is defined as inter packet separation) that is sufficient transiently to use all available bandwidth and cause congestion. If only a small number of probe packets are used, then the induced transient congestion can be absorbed by buffer queues in the nodes. Accordingly, no data packet loss is caused, but rather only a small data path delay increase of a few data packets. The desired measure of the available bandwidth is determined based on the increase in delay due to the probe packets having experienced congestion between sender and receiver node. The probe packet rate where the data path delay begins increasing corresponds to the point of congestion, and thus is indicative of the available bandwidth.

When measuring data path condition such as end-to-end available bandwidth between a sender and a receiver node of a data path in a communication network, both nodes need special software installed. Because of that, it is necessary to have access to both sender and receiver node. Typically, software must be installed or one must be able to control both nodes. This may be undesired or even impossible.

SUMMARY

An object of the present invention is to provide a method for estimating, including monitoring, measuring and evaluating, a data path condition in a communication network, which method does not require access to a plurality of nodes, in particular not to both a probe packet sender and a probe packet receiver node.

According to a first aspect of the present invention, this is provided by a probing method for monitoring data path condition using support from a probe packet sender node only. In a data path of a communication network comprising interconnected nodes, a probe node transmits probe packets with a particular inter-packet separation and a particular (set) time-to-live; the latter typically set lower than the number of hops of intermediate nodes. Responses, typically control message (protocol) packets are then generated by an intermediate node when time-to-live expires. The intermediate node could be any node capable of producing a response when the time-to-live expires. A destination node, typically, the probe node receives the generated control message packets and calculates a received inter-packet separation. Sent and received inter-packet separation is all that is needed to produce an estimation of the condition of the data path such as available bandwidth. This estimation could be provided by means of an algorithm known per se.

Herein, the term "probe node" is referred to as a node including at least a probe packet sender, but may include a sender and receiver. Typically, the probe node acts as both source and destination node.

Herein, the term "intermediate node" refers to a node located in the data path between the probe node and a destination node, of which the latter typically is also a probe node.

Herein, the term "data path" could be any type of data path including the probe node and at least one intermediate node. A data path could comprise one or more separate data links, such as an uplink and a down link of a duplex link. Typically, herein the term "data path" means an end-to-end data path in a communication network.

Herein, the term "node" comprises a network device such as a switch, router, server or end node.

According to another aspect of the present invention, there is provided a method for estimating condition of a data path in a communication network comprising data communication nodes.

The method comprises the steps of:
in a probe node, providing and transmitting a first set of probe packets, having a first inter-packet separation and a time-to-live, to an intermediate node, during real-time operation of the data path;
in the intermediate node, generating a second set of packets when time-to-live expires; said second set of packets having a second packet separation;
transmitting said second set of packets to a destination node;
in response to traversal of the data path by said first set of probe packets,
providing estimation data for use in estimating the condition; and
producing an estimation of the condition, wherein said estimation is calculated on a difference between the first and the second inter-packet separation.

The estimation is typically produced in the probe node, but almost any other suitable node, herein referred to as a "destination node" could be employed instead of the probe node. The estimation is typically performed in real-time, but could also be performed off-line.

The term "set" is not limited to any particular number of packets, but could be any number in excess of one.

The term "generating a second set of packets when time-to-live expires" typically means responding by generating, in particular automatically, a second set of packets having an inter packet separation. Typically, in a data network, by default, a response (an error response), for instance Internet Control Message Protocol (ICMP) packets, are generated automatically when time-to-live expires of the transmitted probe packets. Typically, the second set of packets is transmitted in the form of ICMP time exceeded packets.

In contrast to prior art methods for monitoring data path condition, the present invention provides a method for estimating a condition such as available bandwidth of a data path from a sender node to a receiver node without support from the receiver node, i.e. no software needs to be installed in the receiver node, which is only operating as an intermediate node. The condition could for instance be available bandwidth and/or bottleneck capacity of the data path.

Typically, difference in inter packet separation is analysed by means of an analysis algorithm known per se, for instance selected from: Bandwidth Available in Real Time (BART), pathChirp, Spruce or Pathload. However, the method according to the present invention is not limited to any one of those mentioned.

Typically, the method also comprises the steps of providing a time stamp for each of said set of packets immediately before and after traversal of the data path.

Typically, probe packets are transmitted in trains, for instance pairs, with either constant or variable inter packet separation.

Time-to-live could be set depending on traffic load of the data path or the intermediate nodes. An advantage with this is that it solves problems with routers that sometimes have limitations on generation of ICMP packets.

According to another aspect of the present invention, there is provided an arrangement for estimating condition of a data path of a communication network comprising data communication nodes. The arrangement comprises:
a probe node, being arranged to provide a probe packet sender configured to transmit probe packets, having a first inter-packet separation and a time-to-live, that traverse to an intermediate node during real-time operation of the data path; said probe node being arranged to communicate with an intermediate node being arranged to generate a second set of packets, when time-to-live expires and transmit the second set of packets to a destination node; said destination node comprising:
a data production unit responsive to traversal of the data path by said first set of packets for providing, during said real-time operation of the data path, estimation data for use in estimating the condition; and
an estimation unit arranged to communicate with said data production unit and arranged to produce an estimation of the condition during said real-time operation of the data path, wherein said estimation is calculated on a difference between the first and the second inter-packet separation.

According to another aspect of the present invention, there is provided a system for estimating condition of a data path of a communication network comprising data communication nodes. The system comprises:
a probe node, being arranged to provide a probe packet sender configured to transmit probe packets, having a first inter-packet separation and a time-to-live, to a destination node during real-time operation of the data path;
an intermediate node being arranged to generate a second set of packets, when time-to-live expires and transmit the second set of packets to the probe node;
a data production unit responsive to traversal of the data path by said packets for providing, during said real-time operation of the data path, estimation data for use in estimating the condition; and
an estimation unit arranged to communicate with said data production unit and arranged to produce an estimation of the condition, wherein said estimation is calculated on a difference between the first and the second inter-packet separation.

The present invention permits accurate monitoring of data path condition of a network with modest requirements for data processing and memory resources because support from a probe packet sender node only is required; and sent and received inter-packet separation is all that is needed to produce an estimation of the condition of the data path.

BRIEF DESCRIPTION OF DRAWINGS

Henceforth, reference is made to the attached drawings in the accompanying text of the detailed description of the present invention for a better understanding of the present invention with its embodiments and given examples, wherein.

DETAILED DESCRIPTION

Figure 1:
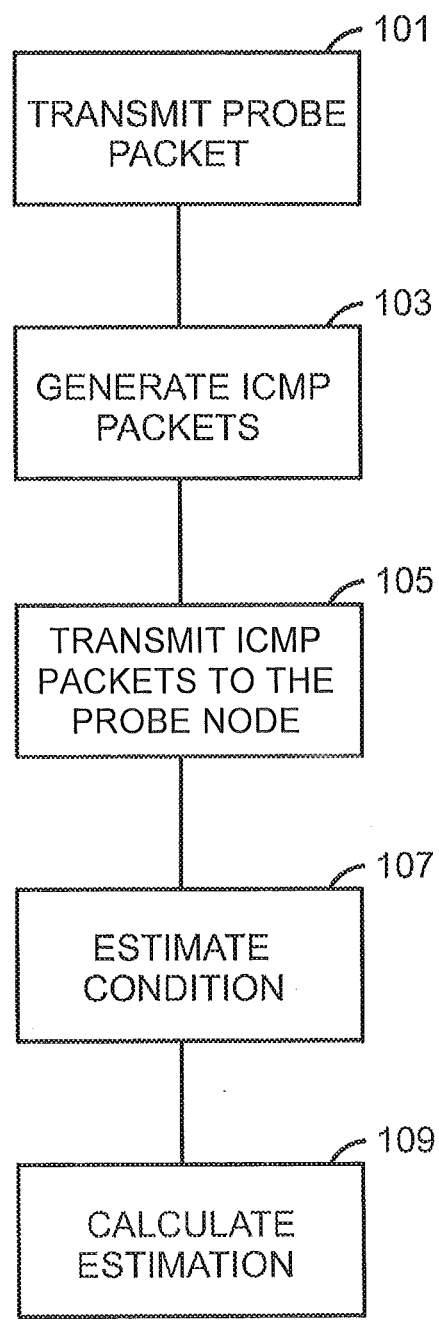
FIG. 1 illustrates a flow-chart of a method for monitoring a data path in a network according to an embodiment of the present invention.

Referring to FIG. 1, there is illustrated a flow-chart of a method for monitoring a data path in a network according to an embodiment of the present invention.

A first set of probe packets, having a first inter-packet separation $IPS1=Y$ and a time-to-live $(TTL)=x$ is provided in a probe node and transmitted to a destination node, step 101.

Then, a second set of packets, typically ICMP packets, having a second packet separation, corresponding to the first set of probe packets is generated in an intermediate node, step 103. The second set of packets (ICMP) is then transmitted back to the probe node, step 105. In response to traversal of the data path by said first set of packets, and during real-time operation of the data path estimation data for use in estimating the condition is provided, typically by means of a destination node node; step 107 and an estimation of the condition during said real-time operation of the data path is produced, step 109, wherein the estimation is calculated based on a difference between the first and the second inter-packet separation.

The estimation is typically produced in the probe node, but almost any other suitable node, herein referred to as a "destination node" that could provide this estimation could be employed instead of the probe node. The estimation is typically performed in real-time, but could also be performed off-line.

Typically, the second set of packets is transmitted in the form of ICMP time exceeded packets.

The estimation is typically produced by means of an analysis algorithm known per se. Examples of such algorithms that could be employed are: Bandwidth Available in Real Time (BART), pathChirp, Spruce or Pathload. These are described in a number of prior art documents, such as U.S. patent application Ser. No. 11/285,723 (Ekelin et al) describing BART, and are well known per se.

In other words, according to an aspect, the present invention provides a probing method for estimating data path conditions such as bottleneck available bandwidth using support only from the probe-packet sender node, i.e. the probe node. Typically, the probe node transmits probe packets with a time-to-live flag lower than the number of hops to the intermediate node. An ICMP packet is generated when TTL expires. The probe node receives the ICMP packets and can calculate the received inter-packet separation. Sent and received inter-packet separation is all that is needed to produce an estimate of the available bandwidth.

The present invention does not require a special analysis method, but is based on an automatically response when time-to-live expires such as ICMP packet generation in an intermediate node, typically a node capable of ICMP packet generation, located somewhere in the data path. Typically, this response functionality is built in according to conventional network standards such as IPv6 and IPv4. Thus, no additional software needs to be installed in any other node than in the probe node.

Typically, the second set of packets is transmitted in the form of ICMP time exceeded packets.

The present invention describes a novel method for actively estimating the available bandwidth from a probe (sender) node to an intermediate receiver utilizing a probe-packet sender only, i.e. the probe-packet receiver used by prior art methods in this area is not required. The invention is independent on what analysis method used, it only defines how the actual probing should be done, from which the available bandwidth estimations are evaluated.

In particular, the present invention provides for fast and accurate estimation of a time-dependent condition associated with a data path, for example, a packet switched data path between two hosts or network nodes on the Internet or another IP network. The properties of the data path are sampled by transmitting probe packets in a specific pattern across the data path.

Figure 2:
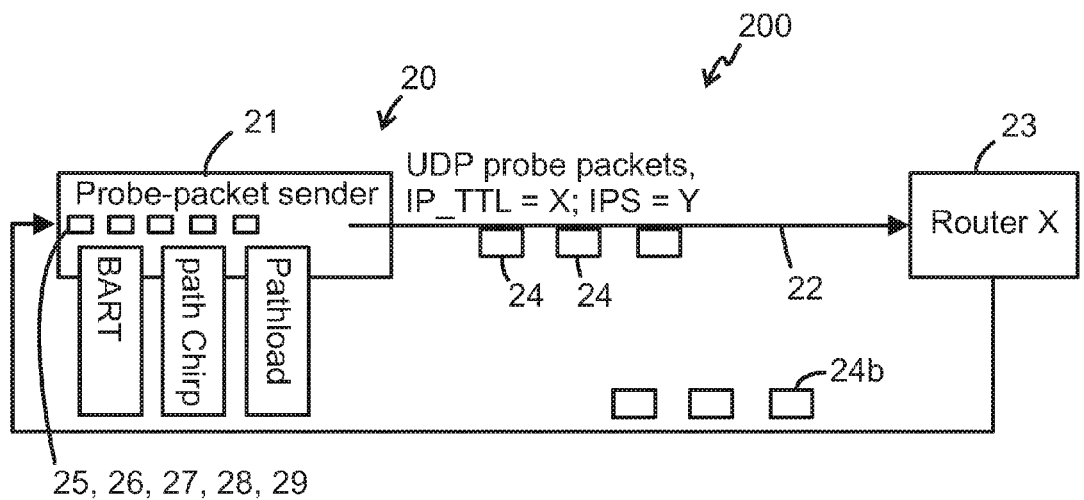
FIG. 2 diagrammatically illustrates a system for monitoring a data path in a network according to exemplary embodiments of the invention.

Now is referred to FIG. 2, which diagrammatically illustrates a system 200 comprising an arrangement 20 for monitoring a data path according to exemplary embodiments of the invention. In some embodiments, the system 200 includes a probe node 21, a data path 22 and an intermediate node 23, of which the latter could be positioned anywhere along the data path 22. The system and arrangement of FIG. 2 is capable of performing the method described above described in relation to and illustrated in FIG. 1. According to some embodiments, the nodes 21 and 23, and the data transfer path 22, can constitute, or form a part of, a packet-switched data network, such as the Internet, a private intranet, etc. The probe node 21, typically configured as a probe-packet sender for User Data Protocol (UDP) probe packets sends sequences of probe packet pairs 24 through the data path 22 to the intermediate node 23. The probe node 21, or in other words, the probe packet sender sets the time-to-live (TTL) flag to a parameter, say X in an IP header of the UDP probe packets. The probe node 21 transmits probe packets 24 having a first inter-packet separation IPSsent to the intermediate node 23. Typically, the intermediate node 23 is a probe packet receiving router located somewhere in the data path 22, i.e. in the uplink and downlink data path of the probe node 21 and the intermediate node 23. In the intermediate node 23 an ICMP packet 24b is generated for each UDP probe packet 24, where a second Inter Packet Separation IPSreceived is set to a parameter Y.

The probe packets 24 traverse the network path 22 to the intermediate node 23. For each node 23 the time-to-line TTL is decreased by one according to Internet standards. Of course, in other types of networks other time-to-live TTL: s may be configured in some other way. When the probe packets 24 arrive at the intermediate node 23, the probe packets 24 are dropped since time-to-live TTL is set to zero, i.e. TTL=0. When the ICMP packets sent from the intermediate node 23 arrive back to the probe node 21, the probe node 21 time stamps the arrival of each received ICMP packet and calculates a second Inter Packet Separation IPSreceived, i.e. inter packet separation received. Thus, the probe node 21 sending probe packets 24 also acts as a receiver. The probe node 21 then selects an analysis algorithm typically selected from BART, pathChip or Pathload, and provides the bandwidth estimation algorithm with inter Packet Separation parameters IPSsent and IPSreceived for estimation of the data path 22. The estimation of the data path 22 such as available bandwidth is determined based on the increase in delay due to the probe packets having experienced congestion between sender and receiver node (which in this case are the same). The aforementioned time stamping at the probe nodes 21 is not explicitly shown in this figure. Typically, the probe node 21 further includes an extraction unit 25 that extracts the time stamp information and the probe packet rate u from the probe packets 24. Typically, a strain calculation unit 26 calculates the inter-packet strain value of each pair of probe packets in the received sequence, and also calculates the average and variance of the inter-packet strain values.

Typically, an available bandwidth calculation unit 28 calculates the available bandwidth estimate B. The available bandwidth estimate B is provided as an output result based on the information gathered from the probe node 21, and is also provided to a comparison unit 29 that compares the probe packet rate u to a threshold value that is equal to or suitably near B. Depending on the result of this comparison, the compare unit 29 provides to the strain calculation unit 25 an indication 20 of whether or not the strain calculation unit 25 should make its calculations for the current sequence of probe packet pairs (BART).

From the foregoing description of FIG. 2, the extraction unit 25 and the strain calculation unit 26 can be seen as components of a data production unit that ultimately produces estimation data in the example of FIG. 2) for use in estimating the available bandwidth.

As already discussed briefly, in some embodiments of the invention, for example, the condition to be estimated is the available bandwidth of the network path. The concept of available bandwidth can be understood as follows. Each link j in a network path has a certain capacity, $C_j$, determined by the network interfaces in the nodes on each end of the link. The capacity $C_j$ is simply the highest possible bit rate over the link at the packet level. The capacity typically does not vary over short time scales. However, the load, or cross traffic, on a given link j, denoted by $S_j(t)$, does vary. The available bandwidth $B_j(t)$ of link j is $B_j(t)=C_j-S_j(t)$. One of links j along the path has the smallest available bandwidth. This "bottleneck link" determines the available bandwidth of the path. The available bandwidth B(t) of a network path is the minimum of the available bandwidths respectively associated with its constituent links:

$$B(t)=\min(C_j-S_j(t)); j$$

The available bandwidth of a network path at any time t can thus be interpreted as the maximum increase in data rate, from sending end to receiving end, which can theoretically occur at time t without causing congestion. It should be noted that cross traffic load and thus available bandwidth are defined using some averaging time scale T, i.e. Sj (t) is calculated by averaging over some time interval of length T around time t. There is no universal, natural choice of T, rather this depends on the specifics of the application. Due to finite link capacity and cross-traffic packet size, T may not be chosen arbitrarily small. However, for modern data networks, available bandwidth and cross traffic load could be defined using T as low as in the sub-second region.

Figure 3:
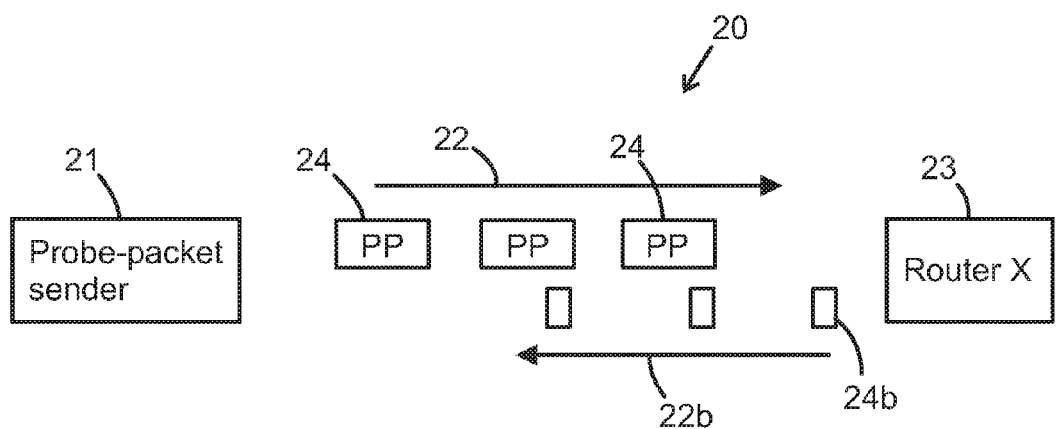
FIG. 3 illustrates how to distinguish between uplink and downlink bottlenecks.

Now is referred to FIG. 3 illustrating how to distinguish between uplink and downlink bottlenecks.

Since the measurement traffic (i.e. probe packets and ICMP packets) travel from the probe node 21 to the intermediate node 23, typically a router, and then back again to the probe node 21, there is no obvious way of determining whether the available bandwidth estimation originate from a bottleneck in the direction from the probe node to the intermediate node 23, or vice versa (assuming full duplex links). However, if congestion actually is detected (i.e. IPSreceived>IPSsent) it is a high possibility that the increase in IPS originate from a bottleneck link in the direction from probe node 21 to the intermediate 23, that is the uplink of the data path.

In FIG. 3 it is explained why. The probe node 21 is sending probe packets 24 at some rate (i.e. with a certain IPS). The probe packets 24 might congest a link 22 on the way to the intermediate node 23. When the ICMP packets 24b are generated at the intermediate node 23, the Inter Packet Separation (IPS) is preserved but the packet size has decreased from the common probe-packet size of say 1500 bytes down to a minimum of approximately 75 bytes of an ICMP packet. That is, the rate on the link 22b from the intermediate node 23 to probe node 21 becomes circa 5% of the original rate, thus congestion is unlikely—especially if it is assumed there is provided asymmetric link such as a xDSL access link and the probe node 21 is located downstream this link 22b.

Now is referred back to FIG. 1 and FIG. 2. According to another embodiment of the present invention probe packets are transmitted in trains.

According to another embodiment of the present invention, the probe node 21 can actually set different time-to-live TTL values for each measurement sample (i.e. each probe-packet train) thereby lowering the load on each router. This is possible since available bandwidth measurement methods only analyze the IPS rather than absolute delay. In case a router is over-loaded, i.e. no response ICMP packets are transmitted another router could be selected instead of the overloaded one. This is not illustrated in detail since it is obvious for a person skilled in the art based on the teachings already illustrated and described, though only one intermediate node (router) 23 has been illustrated and described.

Persons skilled in the art will note that the above-described embodiments of the invention are applicable in many areas, two examples of which are network monitoring and adaptive applications. For example, network operators can use the invention to reliably monitor the state of their networks. As a practical example, if a transmission link goes down or the traffic load suddenly changes, it is desirable for operators to receive a fast and evident indication of the event, so that suitable action can be taken. As an example in the area of adaptive applications, audio/video applications in end hosts can use the invention in order to dynamically adapt the codec to current end-to-end bandwidth availability. The performance can be enhanced by the above-described capability of rapidly adapting to sudden changes in the network.

It will be evident to persons skilled in the art that the invention can be implemented in hardware, software, or a combination of hardware and software.

Although exemplary embodiments of the invention have been described above in detail, this does not limit the scope of the invention, which can be practiced in a variety of embodiments.

Abbreviations Used Throughout the Description
BART Bandwidth Available in Real Time
ICMP Internet Control Message Protocol
IP Internet Protocol
IPS Inter-Packet Separation
TTL Time-To-Live
UDP User Data Protocol

The invention claimed is:

1. A method of estimating a condition in a data path of a communication network, comprising:
   providing and transmitting, in a probe node, a first set of probe packets to a destination node during real-time operation of the data path, the first set of probe packets having a first inter-packet separation (IPSsent) and a time-to-live (TTL);
   receiving a second set of packets at the probe node generated in an intermediate node when the time-to-live (TTL) for the first set of probe packets expires, the second set of packets having a second inter-packet separation (IPSreceived) and being of a decreased size by comparison with the first set of probe packets;
   providing, in response to traversal of the data path by the first set of probe packets, estimation data for use in estimating the condition; and
   producing an estimation of the condition, wherein said estimation of the condition is calculated based on a difference between the first inter-packet separation and the second inter-packet separation.

2. The method of claim 1, wherein the first inter-packet separation and the second inter-packet separation are analysed using an analysis algorithm selected from BART, pathChirp, Spruce and/or Pathload.

3. The method of claim 1, further comprising:
   providing a time stamp for each of the first set of probe packets immediately before and after traversal of the data path.

4. The method of claim 1, wherein the first set of probe packets are transmitted in sequential trains.

5. The method of claim 1, wherein the time-to-live (TTL) is set depending on traffic load of the data path.

6. The method of claim 1, wherein the second set of packets is transmitted using Internet Control Message Protocol (ICMP).

7. The method of claim 6, wherein the second set of packets comprises ICMP time exceeded packets.

8. A system for estimating a condition in a data path of a communication network, comprising:
   at least one processor; and
   a non-transitory computer readable medium comprising computer readable program code that when executed by the at least one processor causes the at least one process to perform operations comprising:
   providing and transmitting, in a probe node, a first set of probe packets to a destination node during real-time operation of the data path, the first set of probe packets having a first inter-packet separation (IPSsent) and a time-to-live (TTL);
   receiving a second set of packets at the probe node generated in an intermediate node when the time-to-live (TTL) for the first set of probe packets expires, the second set of packets having a second inter-packet separation (IPSreceived) and being of a decreased size by comparison with the first set of probe packets;

providing, in response to traversal of the data path by the first set of probe packets, estimation data for use in estimating the condition; and producing an estimation of the condition, wherein said estimation of the condition is calculated based on a difference between the first inter-packet separation and the second inter-packet separation.

9. The system of claim 8, wherein the first inter-packet separation and the second inter-packet separation are analysed using an analysis algorithm selected from BART, pathChirp, Spruce and/or Pathload.

10. The system of claim 8, wherein the operations further comprise:

providing a time stamp for each of the first set of probe packets immediately before and after traversal of the data path.

11. The system of claim 8, wherein the first set of probe packets are transmitted in sequential trains.

12. The system of claim 8, wherein the time-to-live (TTL) is set depending on traffic load of the data path.

13. The system of claim 8, wherein the second set of packets is transmitted using Internet Control Message Protocol (ICMP).

14. The system of claim 13, wherein the second set of packets comprises ICMP time exceeded packets.

* * * * *